(12) United States Patent
Wu

(10) Patent No.: US 7,097,018 B2
(45) Date of Patent: Aug. 29, 2006

(54) WIRE-WINDING DEVICE

(76) Inventor: Sung Chiang Wu, 235 P.O. Box 10-69 Chung-Ho, Taipei (TW)

( * ) Notice: Subject to any disclaimer, the term of this patent is extended or adjusted under 35 U.S.C. 154(b) by 0 days.

(21) Appl. No.: 10/913,579

(22) Filed: Aug. 9, 2004

(65) Prior Publication Data

US 2006/0027433 A1     Feb. 9, 2006

(51) Int. Cl.
*B65H 75/18* (2006.01)

(52) U.S. Cl. .............................. 191/12.2 R; 191/12.4

(58) Field of Classification Search .......... 191/12.2 R, 191/12.4; 439/4, 501; 242/378, 378.4, 396, 242/396.1, 396.3; 381/370, 384
See application file for complete search history.

(56) References Cited

U.S. PATENT DOCUMENTS 5,701,981 A * 12/1997 Marshall et al. ........... 191/12.4
6,019,304 A * 2/2000 Skowronski et al. ....... 242/373
6,733,328 B1 * 5/2004 Lin et al. ................... 439/501
6,851,530 B1 * 2/2005 Wei ........................ 191/12.2 R
2004/0015631 A1 * 1/2004 Kwong et al. .............. 710/302

* cited by examiner

*Primary Examiner*—Mark T. Le

(57) ABSTRACT

A wire-winding device comprises an upper cover. A center of the upper cover being formed with a via hole; a lower side of the upper cover being formed with a sector groove; a rotatable sheet being installed to a rod of the sector groove; a front end of the rotatable sheet being installed with a block; the block being protruded from the rotatable sheet; a center of the rotary base having a via hole; a top of the rotary base being formed with an annular track; the block being embedded into the annular track; a spiral spring being positioned in a lower groove of the rotary base; a lower cover extended with a post at a center of one upper side of the lower cover; a side of the post having a trench for fixing the spiral spring; and a transmission line winding around the rotary base.

1 Claim, 13 Drawing Sheets

WIRE-WINDING DEVICE

FIELD OF THE INVENTION

The present invention relates to wire-winding devices, and particular to a wire-winding device, wherein a transmission line winds around a rotary base so that the transmission line can be wound in order. Thereby, the transmission line can be stored and carried conveniently.

BACKGROUND OF THE INVENTION

UBS transmission lines are more and more popular since more and more electronic devices use UBS connectors for data communication. However, it induces a problem of storage of USB transmission lines. The prior art wire-winding devices have two problems. One is that the positioning unit of the wire-winding device has a rolling ball movable in a guide groove of a rotary disk for rotating and positioning the wire-winding device. However, the rolling ball is very small. It is easily to separate from the guide groove due to collision so as to destroy the wire-winding device. The other problem is that a center of a lower cover of the wire-winding device has a post which is formed by two semi-round rods. A center thereof is locked by a screw and a lateral notch thereof is embedded by a spiral spring. When the screw is locked into the post, the two semi-round rods are possible to be expanded. After using a long time, the ends of the spiral spring will separate from the notch so that the wire-winding device is destroyed.

Moreover, the prior art is not suitable to be carried outdoors. Further, the transmission line is too long to be wound conveniently and easily. Thereby, the transmission line will interact by itself so as to form many joints. When it is desired to use the UBS transmission lines, the user must take a longer time to release the wire-winding device.

SUMMARY OF THE INVENTION

Accordingly, the primary object of the present invention is to provide a wire-winding device, wherein a transmission line winds around a rotary base so that the transmission line can be wound in order. Thereby, the transmission line can be stored and carried conveniently.

Another object of the present invention is to provide a wire-winding device, wherein lower side of the upper cover is formed with a sector groove. A rotatable sheet is installed in a center of the sector groove. A front end of the rotatable sheet is installed with a block. The block is protruded from the rotatable sheet. Each of two ends of the upper cover has a post and a hole. Thus, the transmission line can be positioned properly.

A further object of the present invention is to provide wire-winding device, wherein a lower cover is extended with a post at a center of one upper side of the lower cover. A side of the post has a trench for fixing one end of the spiral spring.

A yet object of the present invention is to provide wire-winding device, wherein the wire-winding device has a simple structure and long lifetime.

To achieve above objects, the present invention provides a wire-winding device. The wire-winding device comprises an upper cover; a center of the upper cover being formed with a via hole; a lower side of the upper cover being formed with a sector groove; the sector groove being a sector area formed at one side of the upper cover; a rotatable sheet being installed to a rod of the sector groove; a front end of the rotatable sheet being installed with a block; the block being protruded from the rotatable sheet; a center of the rotary base having a via hole; a top of the rotary base being formed with an annular track; the block being steadily embedded into the annular track; a spiral spring being positioned in a lower groove of the rotary base; a lower cover extended with a post at a center of one upper side of the lower cover; a side of the post having a trench for fixing one end of the spiral spring; a transmission line winding around the rotary base; a screw being screwed into the combining post of the lower cover through the via hole of the upper cover, a hole of a spiral spring and a center hole formed by winding the transmission line so as to form a wire-winding device.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
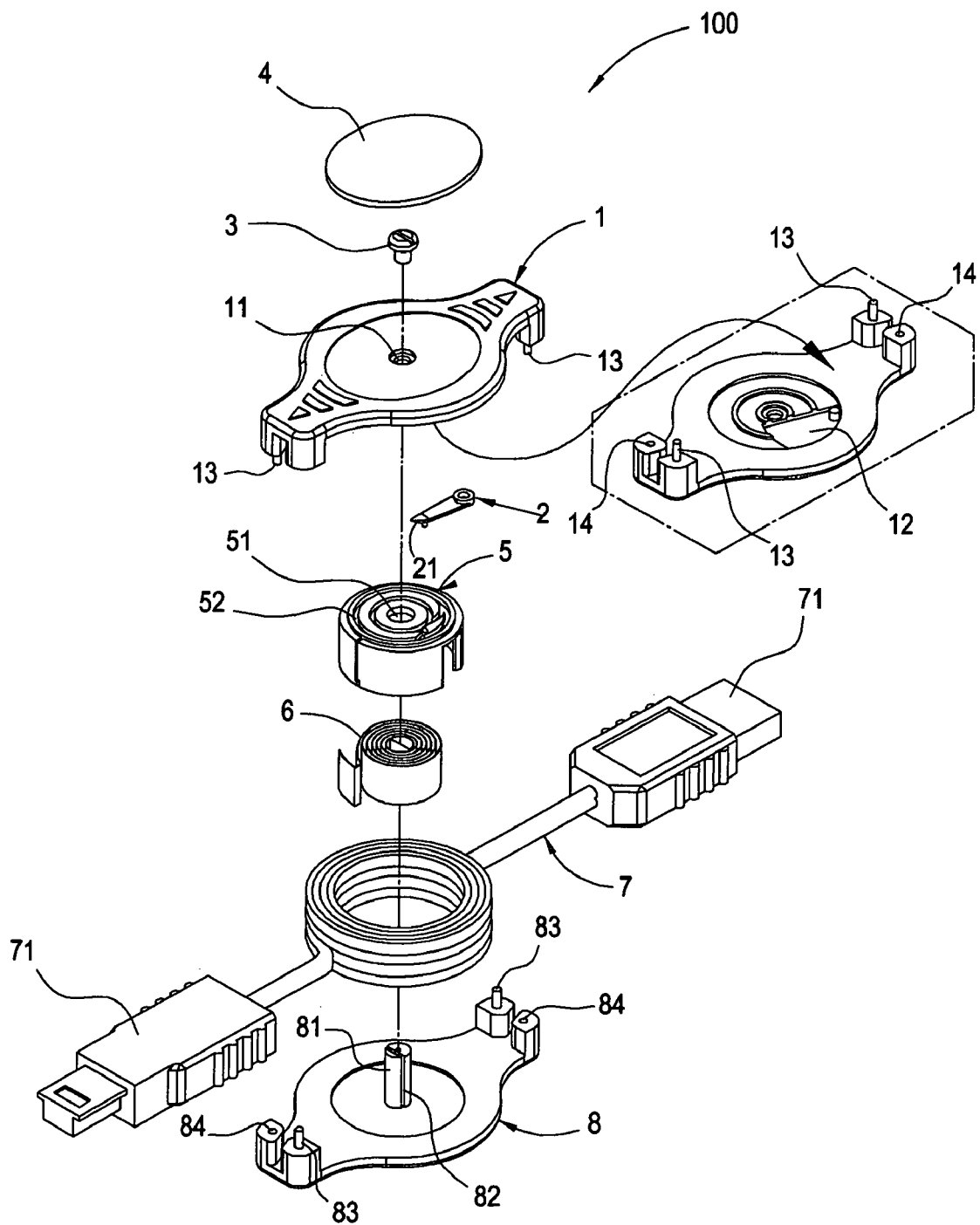
FIG. 1 is an exploded schematic view of the wire-winding device of the present invention.
Figure 2:
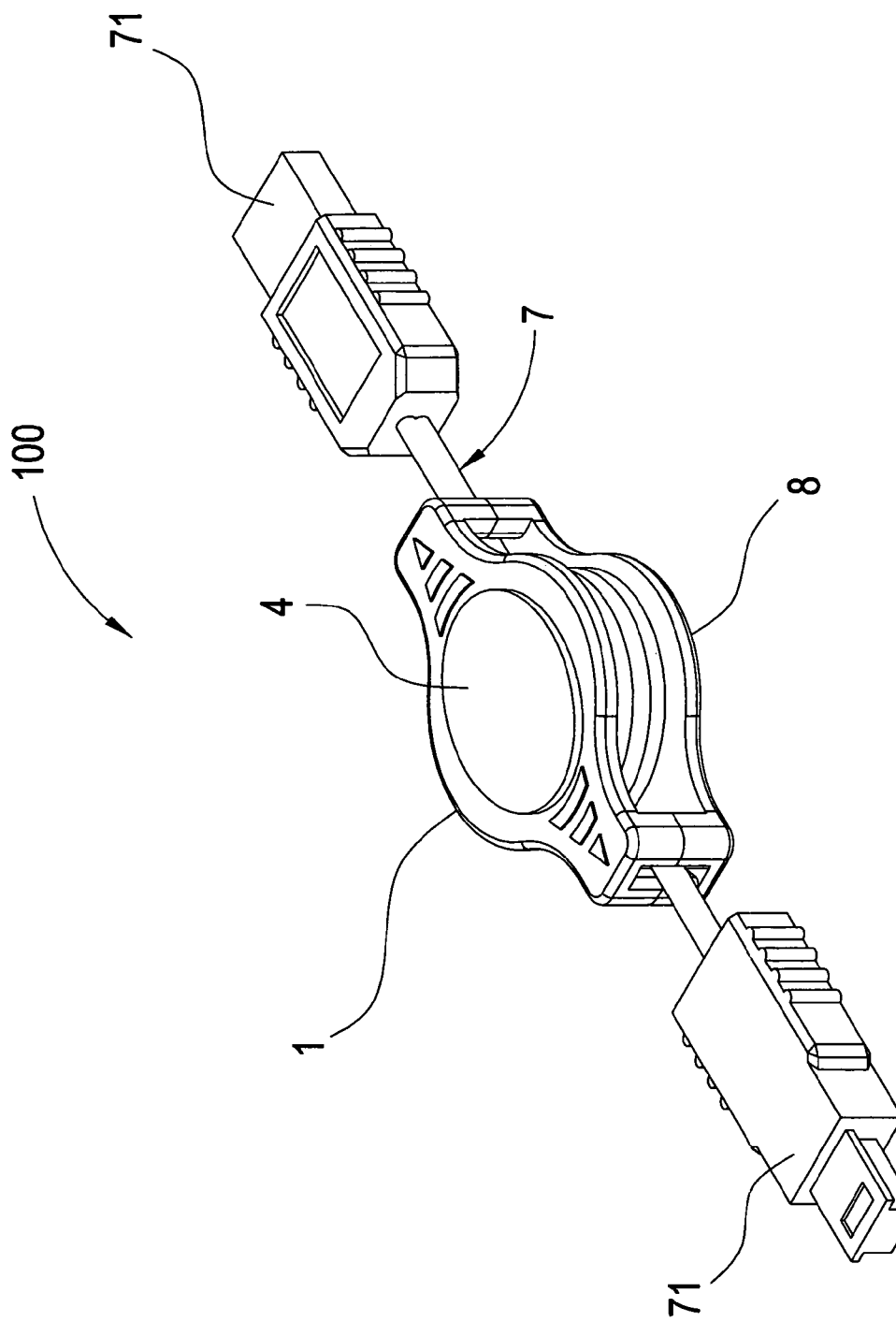
FIG. 2 is a schematic perspective view of the wire-winding device of the present invention.

With reference to FIGS. 1 and 2, the exploded schematic view and schematic perspective view of the present invention are illustrated. It is known from the drawing that the wire-winding device 100 of the present invention comprises the following components.

An upper cover 1 is included. A center of the upper cover 1 is formed with a via hole 11. A decorating sheet 4 covers the upper cover 1. A lower side of the upper cover 1 is formed with a sector groove 12. The sector groove 12 is a sector area formed at one side of the upper cover 1. A rotatable sheet 2 is installed to a rod 121 at one edge of the sector groove 12. A front end of the rotatable sheet 2 is installed with a block 21. The block 21 is protruded from the rotatable sheet 2. Each of two ends of the upper cover 1 has a post 13 and a hole 14.

A center of the rotary base 5 has a via hole 51. A top of the rotary base 5 is formed with an annular track 52. The block 21 is steadily embedded into the annular track 52.

A spiral spring 6 is positioned in a lower groove of the rotary base 5.

A lower cover 8 is extended with a post 81 at a center of one upper side of the lower cover 8. A side of the post 81 has a trench 82 for fixing one end of the spiral spring 6. Each of two ends of the lower cover 8 has a post 83 and a hole 84 for engaging the hole 14 and the post 13 of the upper cover 1. Thereby, the upper cover 1, and lower cover 8 cover the rotary base 5.

A transmission line 7 winds around the rotary base 5. Two ends of the transmission line 7 are connected to UBS connectors 71.

A screw 3 is screwed into the post 81 of the lower cover 8 through the via hole 11 of the tipper cover 1, a hole of a spiral spring 6 and a center hole formed by winding the transmission line 7 so as to form a wire-winding device 100.

Figure 3A:
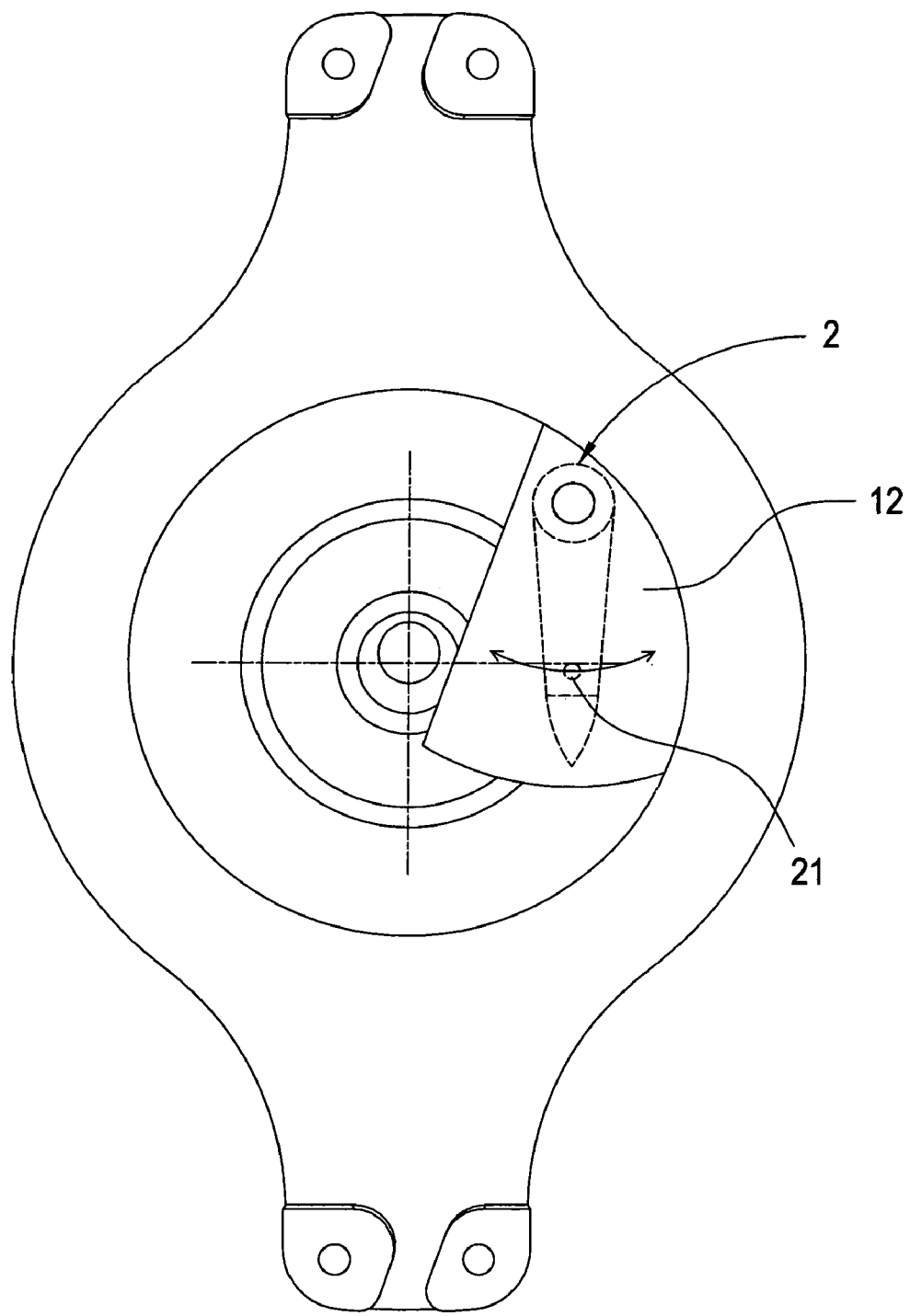
FIGS. 3A to 3J are schematic view about the operation of the positioning sheet and annular track of the wire-winding device of the present invention.
Figure 3B:
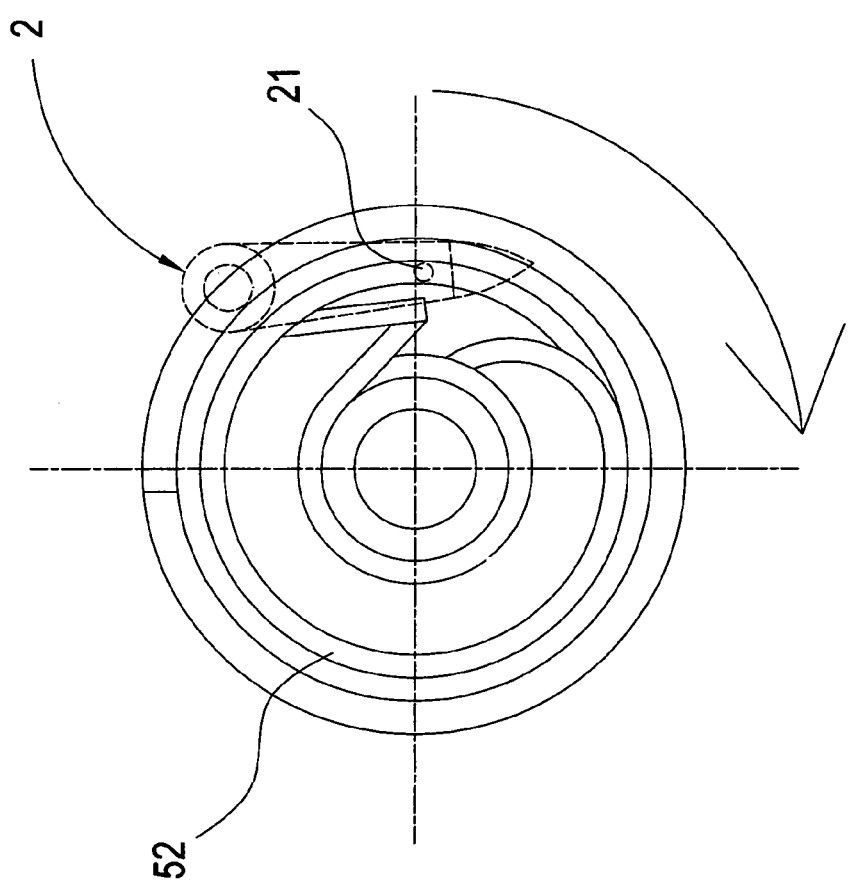
Figure 3C:
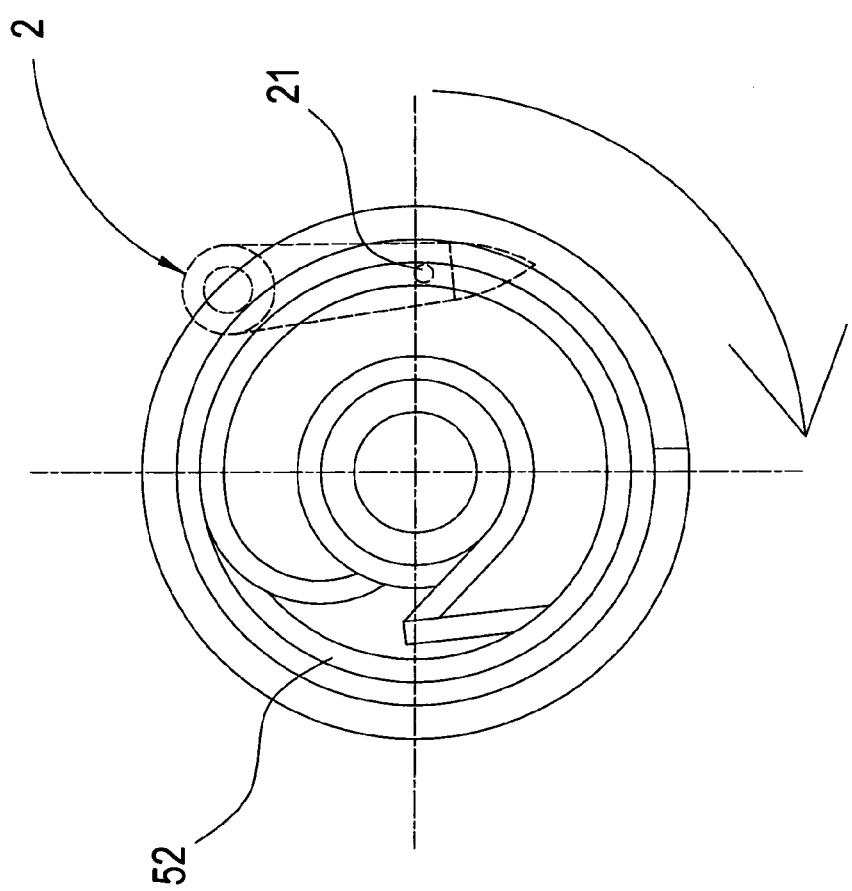
Figure 3D:
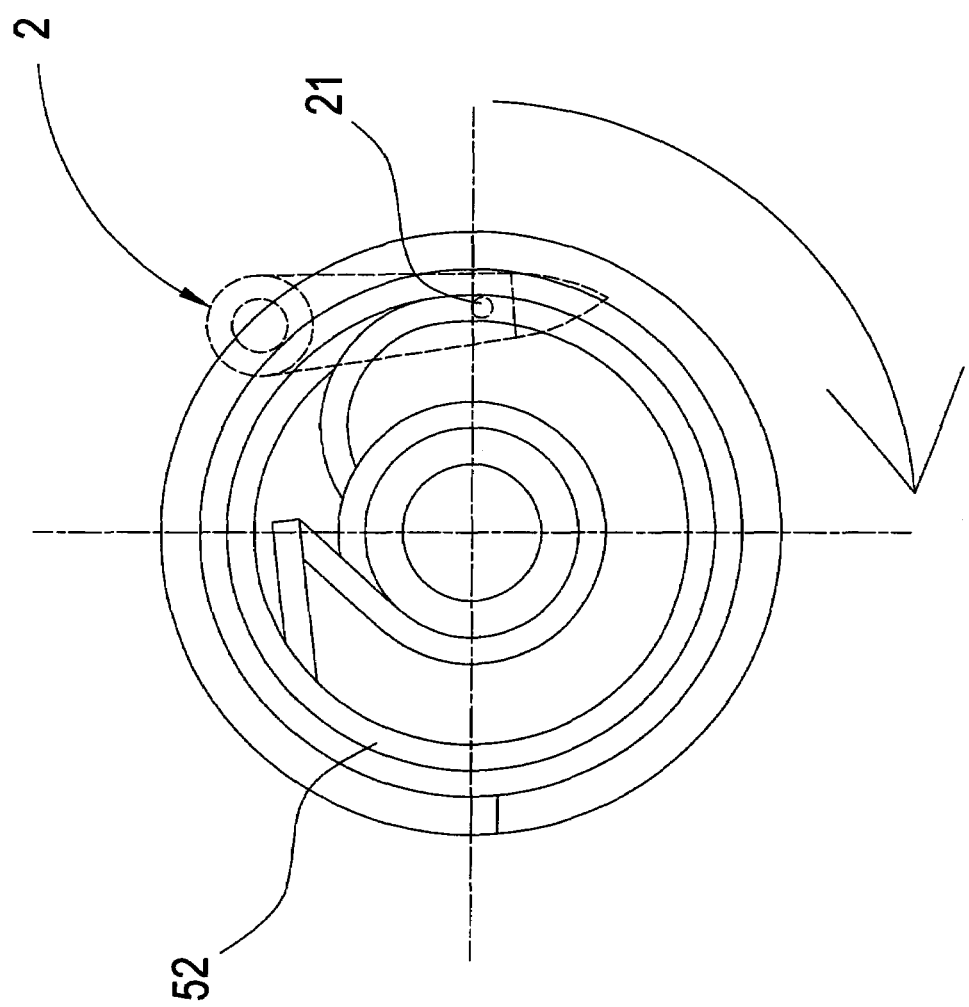
Figure 3E:
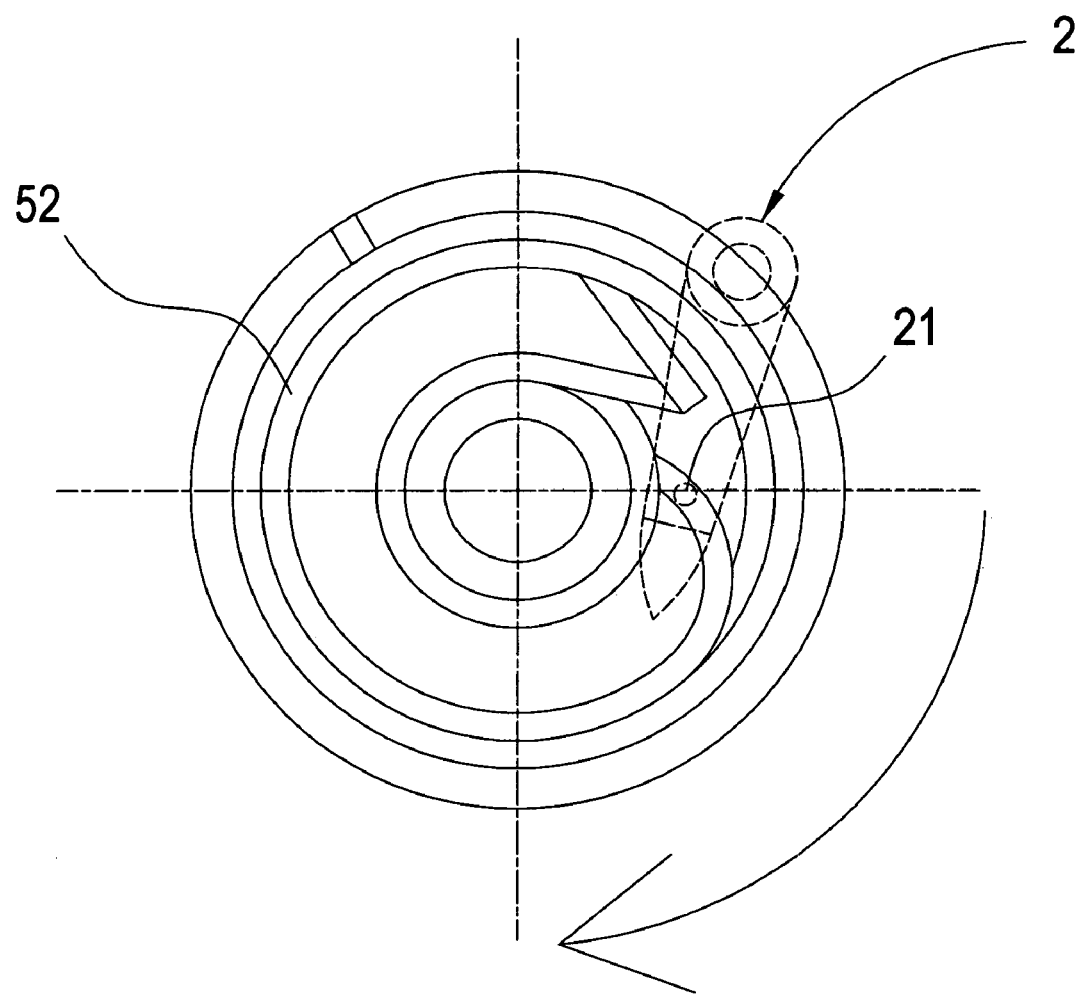
Figure 3F:
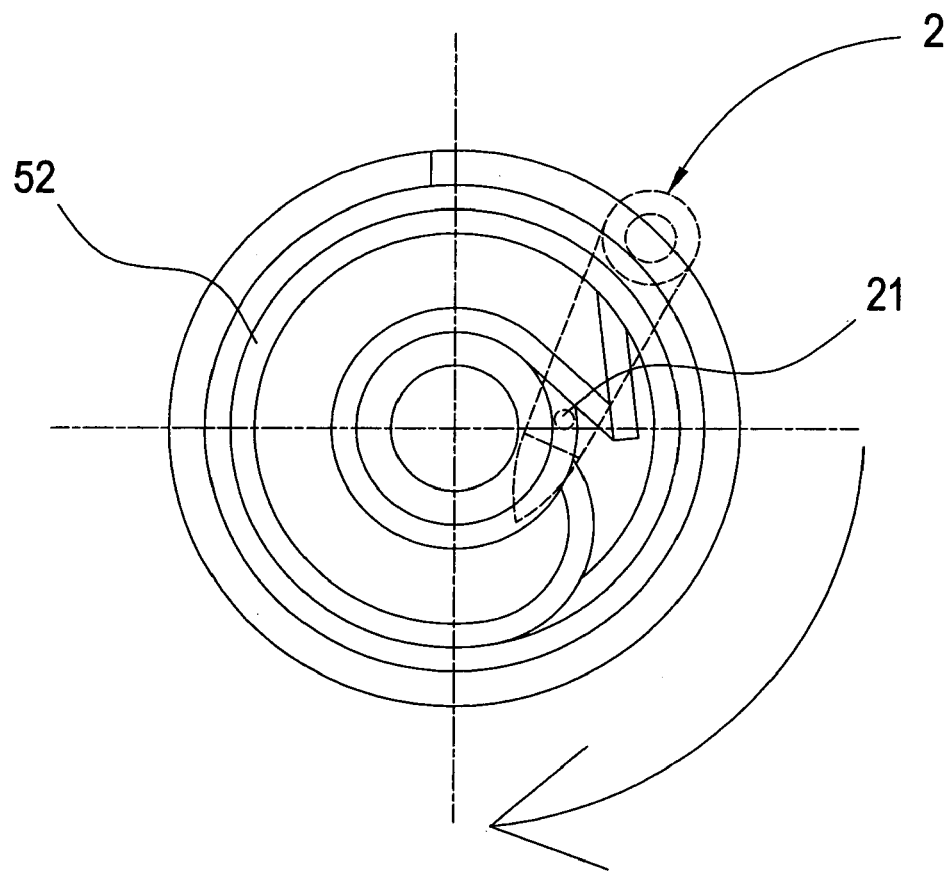
Figure 3G:
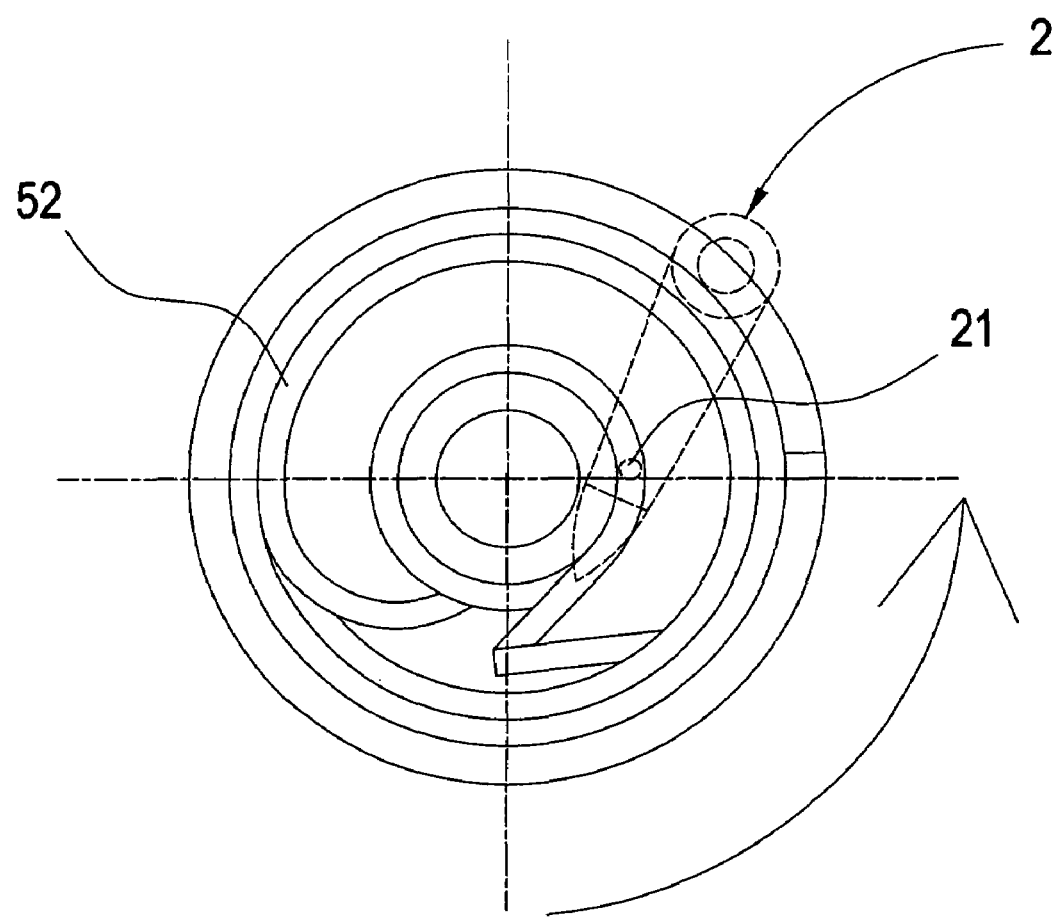
Figure 3H:
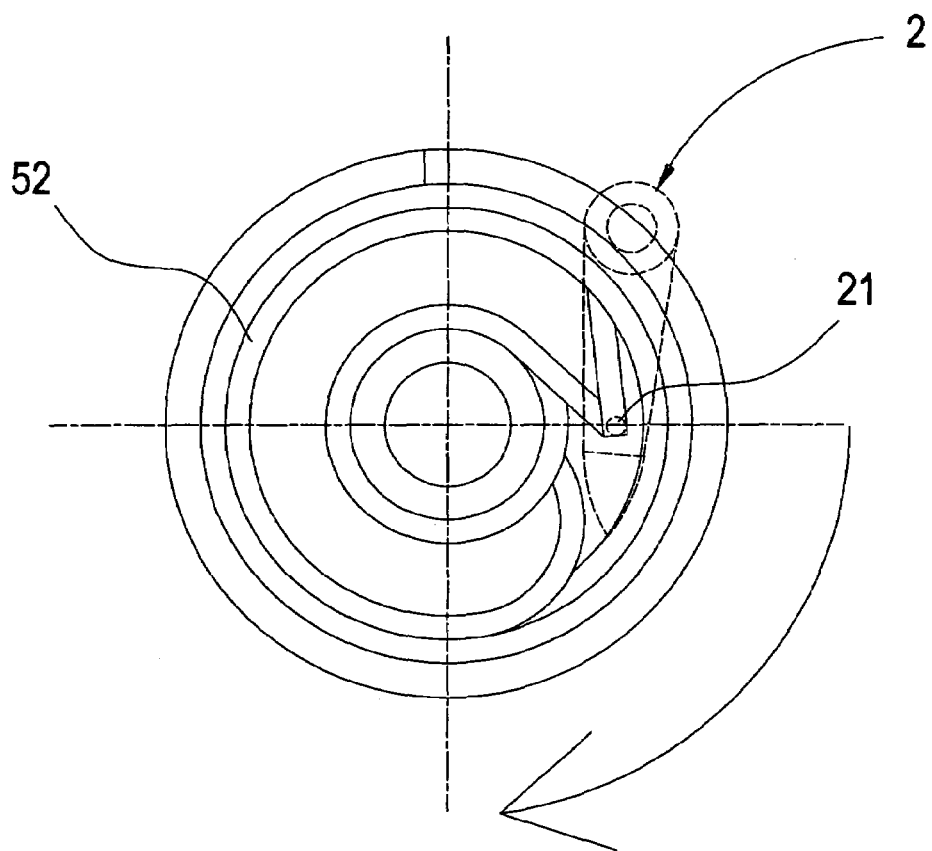
Figure 3I:
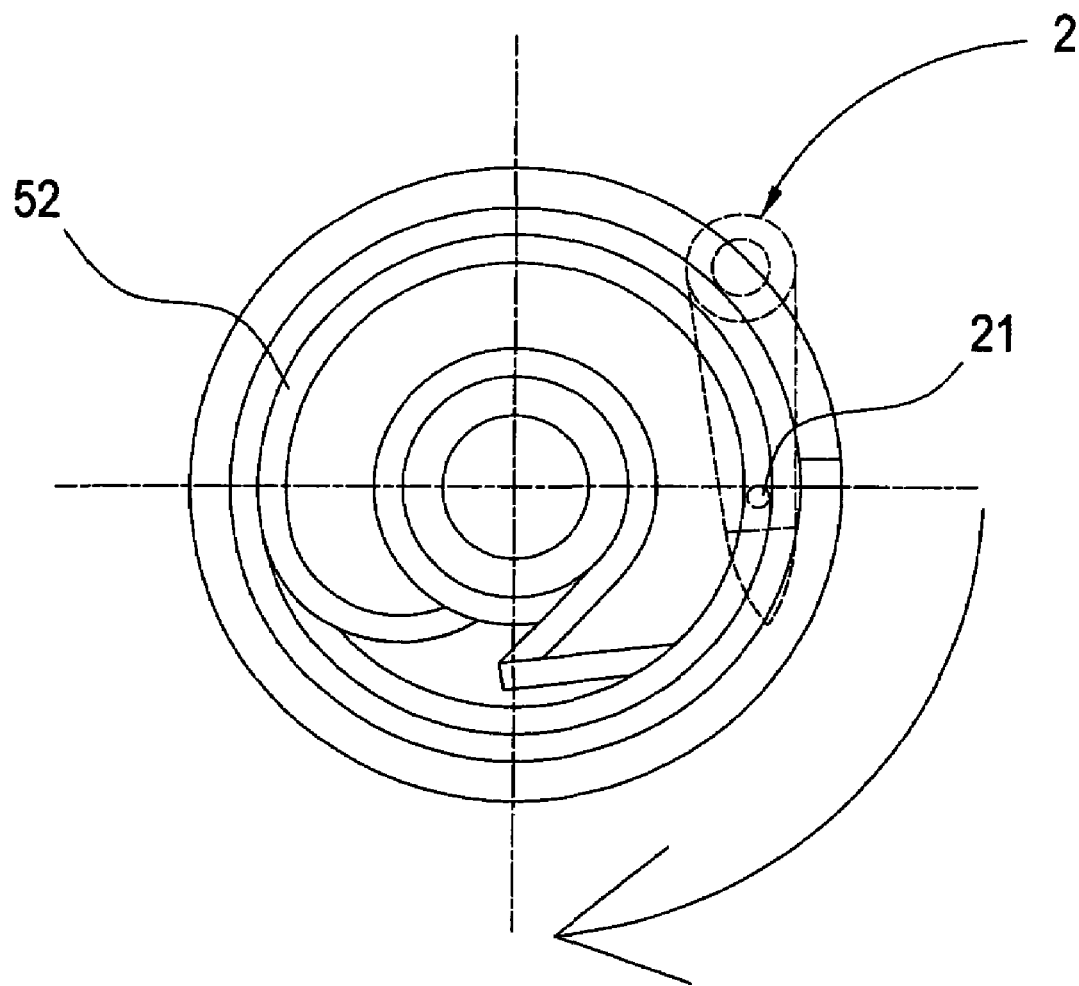
Figure 3J:
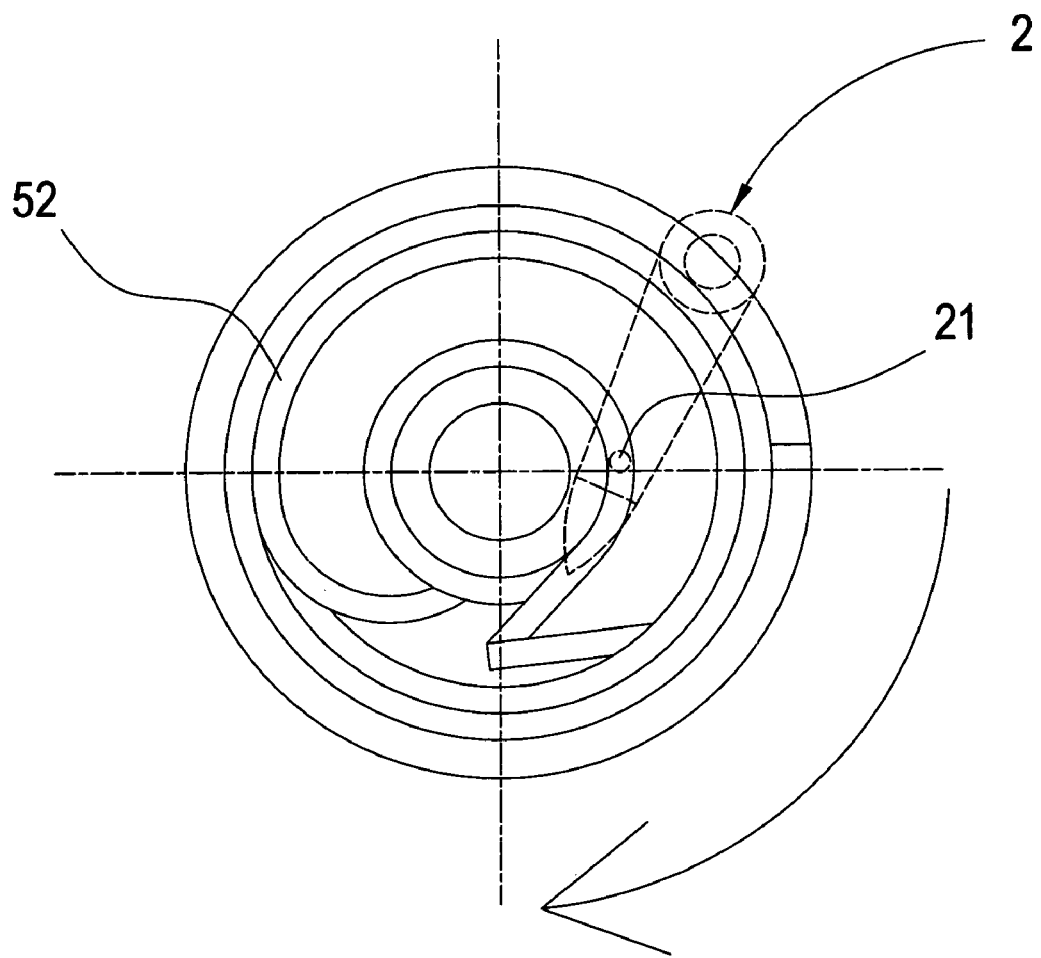

Referring to FIGS. 3A and 3J, the positioning sheet and annular track of the wire-winding device are illustrated. It is appreciated that when the sector groove 12 below the positioning sheet and the annular track 52 of the rotary base 5 are fixed, when the block 21 at a front end of the rotatable sheet 2 is embedded into the annular track 52 and the user pulls the transmission line 7 out of the wire-winding device 100, the annular track 52 will rotate therewith so as to drive the block 21 to displaced in the sector groove 12 and thus the position of the rotatable sheet 2 is changed, as shown in FIGS. 3A to 3J. It is illustrated that the position of the annular track 52, which rotates through 0 degrees, 180 degrees, 270 degrees, 330 degrees, 360 degrees, 450 degrees, 362.2 degrees (a first buckling position), 450 degrees and an extreme position. Thereby, from above mentioned structure, the block 21 is steadily embedded into to the annular track 52. Thus, the effect of positioning is achieved and the prior art problem in winding is resolved.

Figure 4:
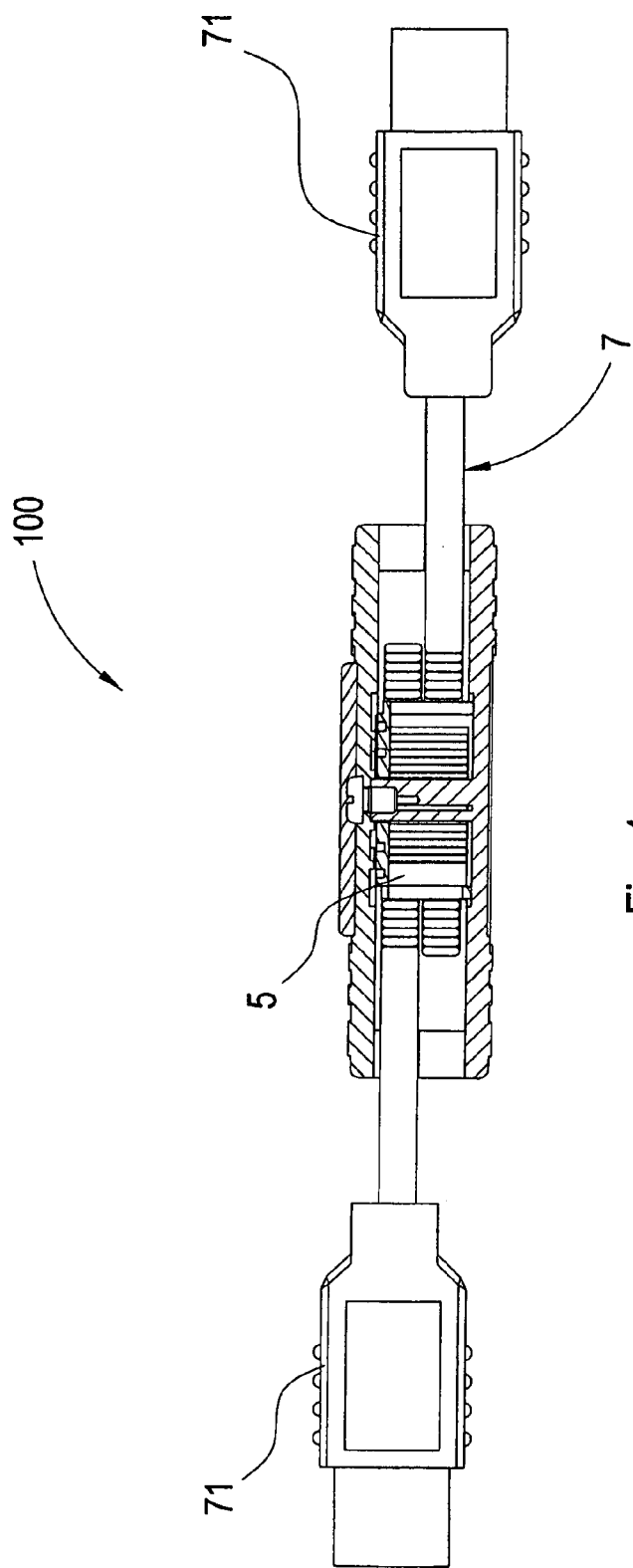
FIG. 4 is a schematic cross view of the wire-winding device of the present invention.

With reference to FIG. 4, the schematic cross view of the wire-winding device of the present invention is illustrated. It is appreciated that when the transmission line 7 is pulled out, it is only necessary to pull the two UBS connectors 71 are pulled outwards and thus the rotary base 5 rotates. Meanwhile, the spiral spring 6 will release the transmission line 7 until the block 21 enters into the annular track 52 to be fixed therein. Therefore, the user may pull the transmission line 7 successfully. When receiving the transmission line 7 in the wire-winding device 100 of the present invention, it is only necessary to cause the block 21 to release from the rotary base 5 of the transmission line 7. By the resilient force of the spiral spring 6, the transmission line 7 can be received to the rotary base 5. Thus the transmission line 7 can be received successfully.

In the present invention, the wire-winding device can be added with a circuit board. Thereby, one end of the transmission line 7 can be installed with an earphone.

In the present invention, the wire-winding device can be added with circuit board having the function of data storage. The circuit board can be installed with a USB connecting hole for receiving the UBS connector for data communication. The transmission line 7 can be installed with an earphone for receiving music.

Advantages of the present invention will be described herein. In the present invention, a circuit board can be installed to the wire-winding device so as to increase the function of the wire-winding device. Moreover, the transmission line can be received effectively so that the transmission line will not interact by itself. Thereby, it can be carried easily. By the structure of the present invention, the problem of the destroy due to careless operation is resolved. Thereby, the structure of the present invention is simple and can be operated easily so as to have a longer lifetime.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wire-winding device comprising:
an upper cover; a center of the tipper cover being formed with a via hole;
a lower side of the upper cover being formed with a sector groove; the sector groove being a sector area formed at one side of the upper cover; a rotatable sheet having one end being installed to a rod at an edge of the sector groove; a front end of the rotatable sheet being installed with a block; the block being protruded from the rotatable sheet;
a rotary base; a center of the rotary base having a second via hole; a top of the rotary base being formed with an annular track; the block being steadily embedded into the annular track;
a spiral spring being positioned in a lower groove of the rotary base;
a lower cover extended with a post at a center of one tipper side of the lower cover; a side of the post having a trench for fixing one end of the spiral spring;
a transmission line winding around the rotary base; a screw being screwed into the post of the lower cover through the via hole of the upper cover, a hole of a spiral spring and a center hole formed by winding the transmission line so as to form a wire-winding device;
wherein two ends of the transmission line are connected to UBS connectors;
wherein a decorating sheet covers the upper cover; and
wherein each of two ends of the upper cover has a post and a hole; each of two ends of the lower cover has a post and a hole for engaging the hole and the post of the upper cover; and thereby, the upper cover and lower cover enclosing the rotary base.

* * * * *